Patented Oct. 2, 1945

2,385,899

UNITED STATES PATENT OFFICE 2,385,899

PRODUCTION OF DIPHENYL SULPHONES

John Weijlard, Westfield, and John Paul Messerly, Clark Township, Union County, N. J., assignors to Merck & Co., Inc., Rahway, N. J., a corporation of New Jersey No Drawing. Application February 4, 1945, Serial No. 474,690

8 Claims. (Cl. 260—397.6)

This invention relates to processes for preparing organic chemical compounds and, more particularly, to processes for the preparation of certain 4,4'-disubstituted diphenyl sulphones.

Our invention contemplates the oxidation of substances which may be represented by the following general formula

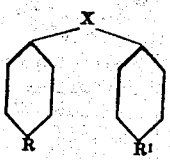

where R and R¹ are members of the class consisting of hydrogen, acylamino-, and nitrogroups; and X is a member of the —S— and $$-\overset{O}{\underset{\|}{S}}-$$

groups, the oxidation being carried out in such manner, using an alkali hypohalogenite as the oxidizing agent, that oxidation occurs by the addition of two or one oxygen atoms to the central sulphide or sulphoxide radical. We have discovered that alkali hypohalogenites, and especially sodium hypochlorite are particularly advantageous oxidizing agents for our purposes, resulting in quantitative yields of the desired 4,4'-disubstituted-diphenyl sulphones. This represents a significant improvement over processes heretofore known for the production of the 4,4'-disubstituted-diphenyl sulphones, wherein other oxidizing agents, such as hydrogen peroxide, have been utilized.

The products obtained according to our invention are useful in combating infections, or as intermediates for the production of such infection-combating substances.

The following examples illustrate methods of carrying out the present invention, but it is to be understood that these examples are given by way of illustration, and not of limitation.

Example I 9.7 gms. of crude 4,4'-di(acetylamino)-diphenyl sulphoxide are dissolved in 170 cc. of boiling glacial acetic acid. 0.5 gm. of an activated carbon is added. The hot solution is filtered, and the carbon residue is washed with 25 cc. of hot glacial acetic acid. 18 gms. of sodium hydroxide are dissolved in 200 cc. of water, 10.65 gms. of chlorine are dissolved in the solution, and the solution is then made up to 250 cc. with water. The hypochlorite solution is added from a burette to the hot (85°) acetic acid solution of the sulphoxide until the oxidation is complete, as ascertained by the starch-potassium iodide test solution using a spot plate.

400 cc. of water are added to the reaction mixture; the solid is filtered off, and washed with water until free from acid, then dried at 70° C. The product has a M. P. of 288–289° C.

8.5 gms. of the crude product are dissolved in 510 cc. of hot 75% ethanol. 1 gm. of activated carbon is added, the mixture is filtered, 500 cc. of water are added, and the mixture is cooled to 5° C. The crystals are collected on a filter and dried at 70° C. The product, 4,4'-di(acetylamino)-diphenyl sulphone, has a melting point of 291–293° C.

Example II 5 gms. of chlorine are dissolved in a solution of 5.6 gms. sodium hydroxide in 100 cc. water, and cooled to 5° C. 10 gms. of finely powdered di-(acetylamino)-diphenyl sulphide are added, and the mixture is stirred mechanically. A solution of 0.25 gm. of nickel sulphate in a few cubic centimeters water is added. The mixture is subjected to fast stirring, the temperature being held at 4–8° C., for two hours. The mixture is then allowed to warm up to 20° C. and held there for ½ hour. The solid is filtered off, washed with water, and dried at 70° C.—M. P. 230–240° C.

The crude product is triturated with 100 cc. of hot methanol, cooled to 40° C., filtered, washed with methanol, and dried; the product, 4,4'-di-(acetylamino)-diphenyl sulphone, has a melting point of 270–275° C. On recrystallization, as in Example I, the melting point may be raised to 291–293° C.

Example III 5.0 gms. of chlorine are dissolved in a solution of 5.6 gms. sodium hydroxide in 75 cc. of water, and the solution is made up to 100 cc. with water.

2 gms. of 4,4'-di-nitro-diphenyl sulphide are dissolved in 100 cc. of hot glacial acetic acid, and 20 cc. of the hypochlorite solution are added from a burette, with vigorous stirring. The mixture is held on the steam bath for 30 minutes, diluted with 200 cc. of water, cooled, filtered, and washed with water. The product, 4,4'-di-nitro-diphenyl sulphone, melts at 285–290° C., with charring.

Example IV 2 gms. of di(acetyldiamino)-diphenyl sulphide are dissolved in 50 cc. of hot (85–90° C.) glacial acetic acid, 20 cc. of the hypochlorite solution (prepared as in Example III) are added from a burette, with vigorous agitation. The solution is diluted with 200 cc. of water, the crystals are filtered off and washed with water, then dried; melting point, 289–289.5° C. On further purification over 75% alcohol, the melting point may be raised to 290–293° C.

Modifications may be made in carrying out the present invention, without departing from the spirit and scope thereof, and we are to be limited only by the appended claims.

We claim:

1. The process that comprises reacting an aqueous solution of alkali metal hypohalogenite with a hot, vigorously agitated, glacial acetic acid solution of a compound of the class consisting of 4,4'-di(acylamino)-diphenyl sulphide, 4,4'-di(acylamino)-diphenyl sulphoxide, 4,4'-dinitro-diphenyl sulphide and 4,4'-dinitro-diphenyl sulphoxide, and recovering the corresponding 4,4'-disubstituted-diphenyl sulphone.

2. The process that comprises reacting an aqueous solution of sodium hypochlorite with a hot, vigorously agitated, glacial acetic acid solution of a compound of the class consisting of 4,4'-di(acylamino)-diphenyl sulphide, 4,4'-di(acylamino)-diphenyl sulphoxide, 4,4'-dinitro-diphenyl sulphide and 4,4'-dinitro-diphenyl sulphoxide, and recovering the corresponding 4,4'-disubstituted-diphenyl sulphone.

3. The process that comprises reacting an aqueous solution of alkali metal hypohalogenite with a hot, vigorously agitated, glacial acetic acid solution of 4,4'-di(acylamino)-diphenyl sulphide, and recovering 4,4'-di(acylamino) diphenyl sulphone.

4. The process that comprises reacting an aqueous solution of sodium hypochlorite with a hot, vigorously agitated, glacial acetic acid solution of 4,4'-di(acylamino)-diphenyl sulphide, and recovering 4,4'-di(acylamino)-diphenyl sulphone.

5. The process that comprises reacting an aqueous solution of alkali metal hypohalogenite with a hot, vigorously agitated, glacial acetic acid solution of 4,4'-di(acylamino)-diphenyl sulphoxide, and recovering 4,4'-di(acylamino)-diphenyl sulphone.

6. The process that comprises reacting an aqueous solution of sodium hypochlorite with a hot, vigorously agitated, glacial acetic acid solution of 4,4'-di(acylamino)-diphenyl sulphoxide, and recovering 4,4'-di(acylamino)-diphenyl sulphone.

7. The process that comprises reacting an aqueous solution of alkali metal hypohalogenite with a hot, vigorously agitated, glacial acetic acid solution of 4,4'-dinitro-diphenyl sulphide, and recovering 4,4'-dinitro-diphenyl sulphone.

8. The process that comprises reacting an aqueous solution of sodium hypochlorite with a hot, vigorously agitated, glacial acetic acid solution of 4,4'-dinitro-diphenyl sulphide, and recovering 4,4'-dinitro-diphenyl sulphone.

JOHN WEIJLARD.
JOHN PAUL MESSERLY.